United States Patent
Wu et al.

(10) Patent No.: US 9,432,297 B2
(45) Date of Patent: Aug. 30, 2016

(54) JITTER-BASED TRANSMISSION CONTROL METHOD

(71) Applicant: National Central University, Taoyuan County (TW)

(72) Inventors: Hsiao-Kuang Wu, Taoyuan County (TW); Jyh-Ming Chen, Taoyuan County (TW); Ching-Hsiang Chu, Taoyuan County (TW)

(73) Assignee: National Central University, Taoyuan (TW)

( * ) Notice: Subject to any disclaimer, the term of this patent is extended or adjusted under 35 U.S.C. 154(b) by 178 days.

(21) Appl. No.: 14/334,683

(22) Filed: Jul. 18, 2014

(65) Prior Publication Data

US 2015/0023175 A1    Jan. 22, 2015

Related U.S. Application Data

(60) Provisional application No. 61/847,574, filed on Jul. 18, 2013.

(51) Int. Cl.
| | | |
|---|---|---|
| *H04L 12/841* | (2013.01) | |
| *H04L 12/807* | (2013.01) | |
| *H04L 12/26* | (2006.01) | |
| *H04L 1/20* | (2006.01) | |

(52) U.S. Cl.
CPC ............ *H04L 47/27* (2013.01); *H04L 43/087* (2013.01); *H04L 47/283* (2013.01); *H04L 1/205* (2013.01)

(58) Field of Classification Search
CPC .... H04L 47/27; H04L 47/283; H04L 43/087
See application file for complete search history.

(56) References Cited

PUBLICATIONS

Wu et al., JTCP: Jitter-Based TCP for Heterogeneous Wireless Networks, IEEE Journal on Selected Areas in Communications, vol. 22, No. 4, May 2004, p. 757-766.*
Chen et al., Improving SCTP Performance by Jitter-Based Congestion Control over Wired-Wireless Networks, EURASIP Journal on Wireless Communications and Networking, Dec. 2011, 14 pages (including cover page).*
Airiti Library, abstract for Jitter-based TCP for Incast Communication on Data Center Networks, Jan. 1, 2012, 2 pages.*

* cited by examiner

*Primary Examiner* — Hoon J Chung
(74) *Attorney, Agent, or Firm* — CKC & Partners Co., Ltd.

(57) ABSTRACT

A jitter-based transmission control method is disclosed. In the jitter-based transmission control method, several packets are sent applying a current congestion window size by at least one sender device through a network switch device. An immediate jitter ratio of the network switch device is calculated by the sender device. An average jitter ratio of the network switch device is updated by the sender device according to the immediate jitter ratio and the current congestion window size. The current congestion window size is reduced when the immediate jitter ratio or the updated average jitter ratio is positive and larger than a queued threshold over the current congestion window size, such that the packets are sent applying the reduced current congestion window size.

11 Claims, 6 Drawing Sheets

JITTER-BASED TRANSMISSION CONTROL METHOD

RELATED APPLICATIONS

This application claims priority to U.S. Provisional Application Ser. No. 61/847,574, filed Jul. 18, 2013, which is herein incorporated by reference.

BACKGROUND

1. Technical Field

The present invention relates to a network transmission control method. More particularly, the present invention relates to a jitter-based transmission control method.

2. Description of Related Art

In the last decade, various cloud-based applications have been proposed to meet the user requirements. Many well-known global companies like Google®, Facebook®, Amazon®, and Microsoft® have developed their own cloud-based products for web search, social networks, electronic commerce and large-scale computation and storage systems. A data center network is the core component involved in building a cloud environment. Numerous clusters of storage and computation servers are connected via switches to form the basic architecture of a data center network.

A data center network provides large-scale storage and computing resources to response to clients' requests immediately over high-bandwidth and low-delay links. However, a unique incast communication pattern on a data center causes performance degradation to the commodity TCP variants. Unfortunately, few solutions can solve the problem in a fundamental manner at a low cost and based on a TCP-level solution.

Furthermore, state-of-the-art hardware on data center networks is able to provide 10 Gbps or an even higher bandwidth and a microsecond-level of latency of links between nodes to reduce the response time. Whenever a user issues a request to a cloud application, a job to search has to be created in the cloud and useful information is collected accordingly inside the data center networks. The common goal of cloud applications is to complete on-demand jobs in a restricted deadline and respond to users as soon as possible. Moreover, reliability and abundance of response data are also key features to improve the user experience.

Under such circumstances, commodity TCP is one of the best candidates for communication between servers in data center networks because of its low cost and ease-of-implementation. However, the communication pattern on data center networks is different from traditional wide area networks. As a result, the TCP incast goodput collapse problem occurs to degrade performance.

SUMMARY

According to one embodiment of this invention, a jitter-based transmission control method is disclosed to adjust a congestion window size for sending packets according to a jitter ratio. The jitter-based transmission control method includes the following steps:

(a) At least one sender device sends several packets applying a current congestion window size through a network switch device.

(b) The sender device calculates an immediate jitter ratio of the network switch device.

(c) The sender device updates an average jitter ratio of the network switch device according to the immediate jitter ratio and the current congestion window size.

(d) The current congestion window size is reduced when the immediate jitter ratio or the updated average jitter ratio is positive and larger than a queued threshold over the current congestion window size, such that the packets are sent applying the reduced current congestion window size.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
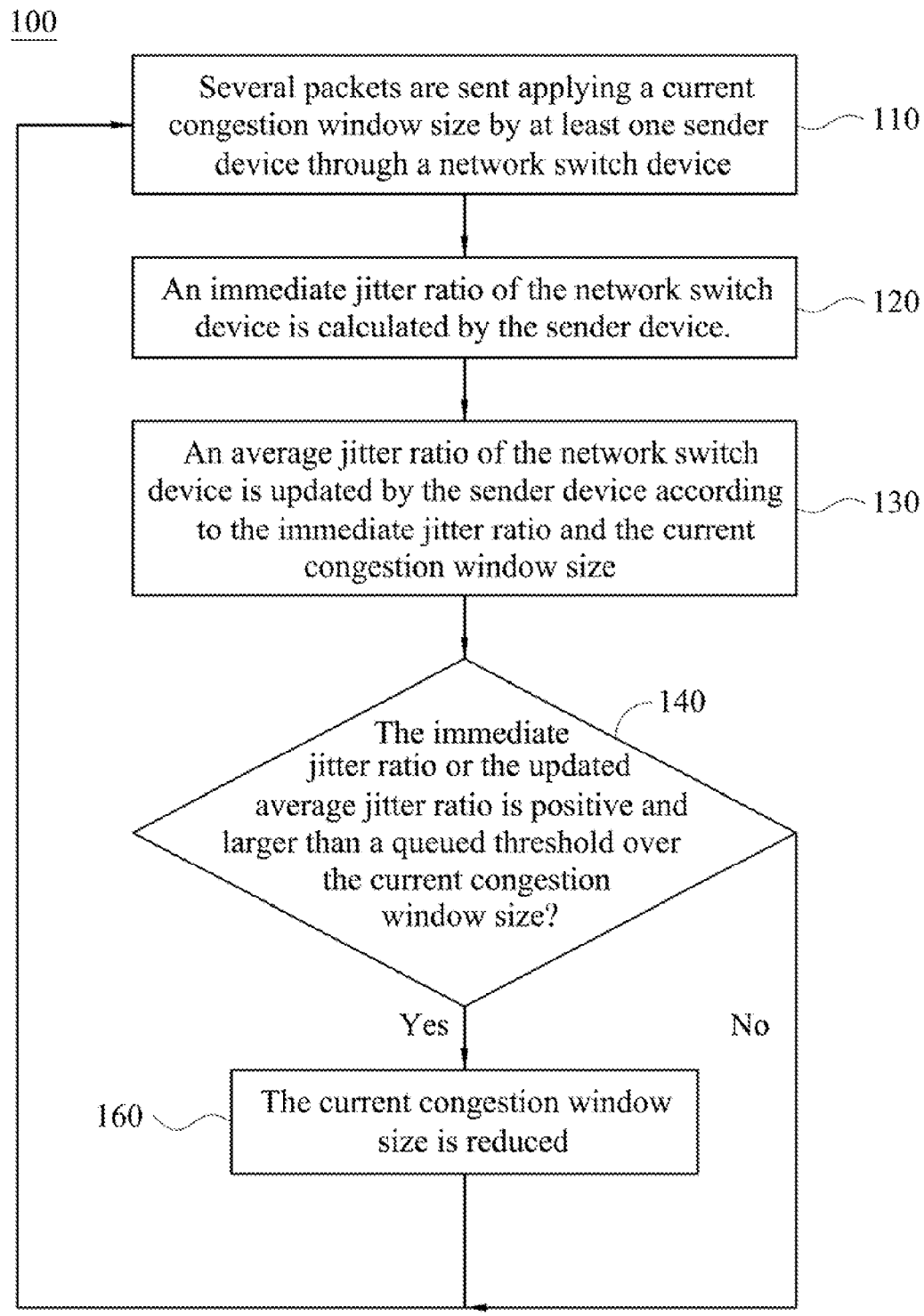
FIG. 1 is a flow diagram of a jitter-based transmission control method according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Figure 2:
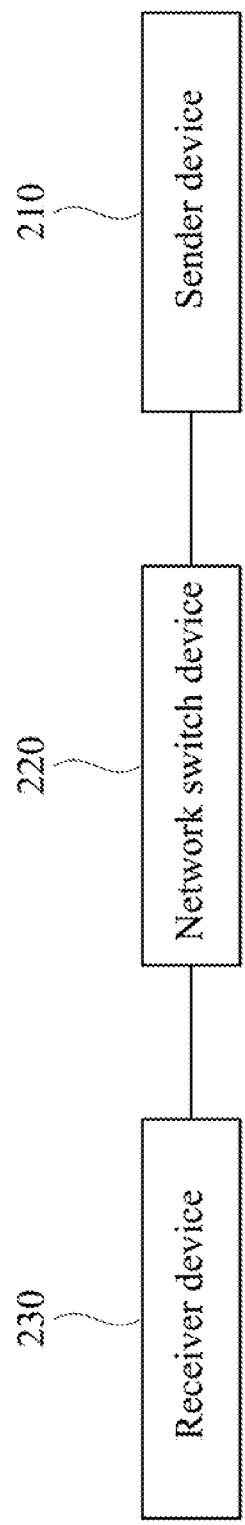
FIG. 2 illustrates a system applying the jitter-based transmission control method.

FIG. 1 is a flow diagram of a jitter-based transmission control method according to one embodiment of this invention. FIG. 2 illustrates a system applying the jitter-based transmission control method. Reference is made to both FIG. 1 and FIG. 2 for a description of the jitter-based transmission control method.

In the jitter-based transmission control method, a congestion window size for sending packets is adjusted according to a jitter ratio. The jitter-based transmission control method may take the form of a computer program product stored on a non-transitory computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs), digital versatile disc read only memories (DVD-ROMs), and Blu-ray Disc® read only memories (BD-ROMs); magnetic storage devices such as hard disk drives (HDDs) and floppy disk drives; and solid-state disks (SSDs).

The jitter-based transmission control method 100 includes a number of steps as outlined below.

At step 110, at least one sender device 210 sends several packets applying a current congestion window size through a network switch device 220. In some embodiments, the sender device 210 can apply a wired network protocol or a wireless network protocol to send packets through the network switch device 220. The network switch device 220 can provide a network switching function. In some embodiments, the sender device 210 may want to send the packets to a single receiver device 230 through the network switch device 220.

At step 120, the sender device 210 calculates an immediate jitter ratio of the network switch device 220. In some embodiments, the sender device 210 may calculate the immediate jitter ratio of the network switch device 220 utilizing the following formula:

$$i\_Jr = D_{(n-w,n-1)}/R_{n-1} - R_{n-w}$$

where n is the packet number of a current acknowledge packet, w is the current congestion window size, the packet n-1 is received at $R_{n-1}$, the packet n-w is received at $R_{n-w}$, and $D_{(n-w,n-1)}$ is an inter-arrival jitter between the packet n-1 and the packet n-w.

In some embodiments, the sender device 210 can receive information about $R_{n-1}$, $R_{n-w}$, $D_{(n-w,n-1)}$ from the network switch device 220.

At step 130, the sender device 210 updates an average jitter ratio of the network switch device 220 according to the immediate jitter ratio and the current congestion window size. In some embodiments, the sender device 210 updates an average jitter ratio of the network switch device 220 utilizing the following formula:

$$u\_Avg\_Jr = p\_Avg\_Jr \times g + i\_Jr, g = \frac{1}{w}$$

where u_Avg_Jr is the updated average jitter ratio, p_Avg_Jr is the average jitter ratio before being updated, w is the current congestion window size, and i_Jr is the immediate jitter ratio.

Subsequently, at step 140, a determination is made as to whether the immediate jitter ratio or the updated average jitter ratio is positive and larger than a queued threshold over the current congestion window size. The determination at step 140 may be performed by the sender device 210.

At step 160, when the immediate jitter ratio or the updated average jitter ratio is positive and larger than a queued threshold over the current congestion window size, the current congestion window size is reduced, such that the packets are sent applying the reduced current congestion window size (step 110). In some embodiments, the queued threshold may be preset to 1 for better performance. In some embodiments, the current congestion window size can be reduced utilizing the following formula:

$$r\_cwnd = Max\left(c\_cwnd \times (1 - u\_Avg\_Jr), \frac{c\_cwnd}{2}\right)$$

where r_cwnd is the reduced current congestion window size, c_cwnd is the current congestion window size before being reduced, and u_Avg_Jr is the updated average jitter ratio.

Therefore, the current congestion window size is at most reduced by half when the updated average jitter ratio is close to "1," indicating that the congestion window size can be gradually reduced as soon as the queue length of the network switch device 220 increases. That is, the jitter-based transmission control method 100 can provide stable and high goodput while avoiding a situation in which the packets overwhelm the queue, making the jitter-based transmission control method 100 especially suitable when the sender device 210 and the network switch device 220 are disposed in the same data center network to provide high speed data transmission.

When the immediate jitter ratio and the updated average jitter ratio are both positive and not larger than the queued threshold over the current congestion window size, the packets are sent without reducing the current congestion window size (step 110).

In some embodiments, there may be more than one sender device to send packets (step 110), and each sender device may perform step 110, step 120, step 130, step 140 and step 160 to adjust its current congestion window size for sending its packets. In addition, an additive increase multiplicative decrease (AIMD) scheme may be also performed when a successful transmission of the packets occurs when sending the packets. Moreover, fast transmission and fast recovery can also be left unchanged for the sender device 210 to perform its operation. When the immediate jitter ratio is negative, the sender device 210 may keep its current congestion window size the same for transmitting the packets at step 110.

Figure 3:
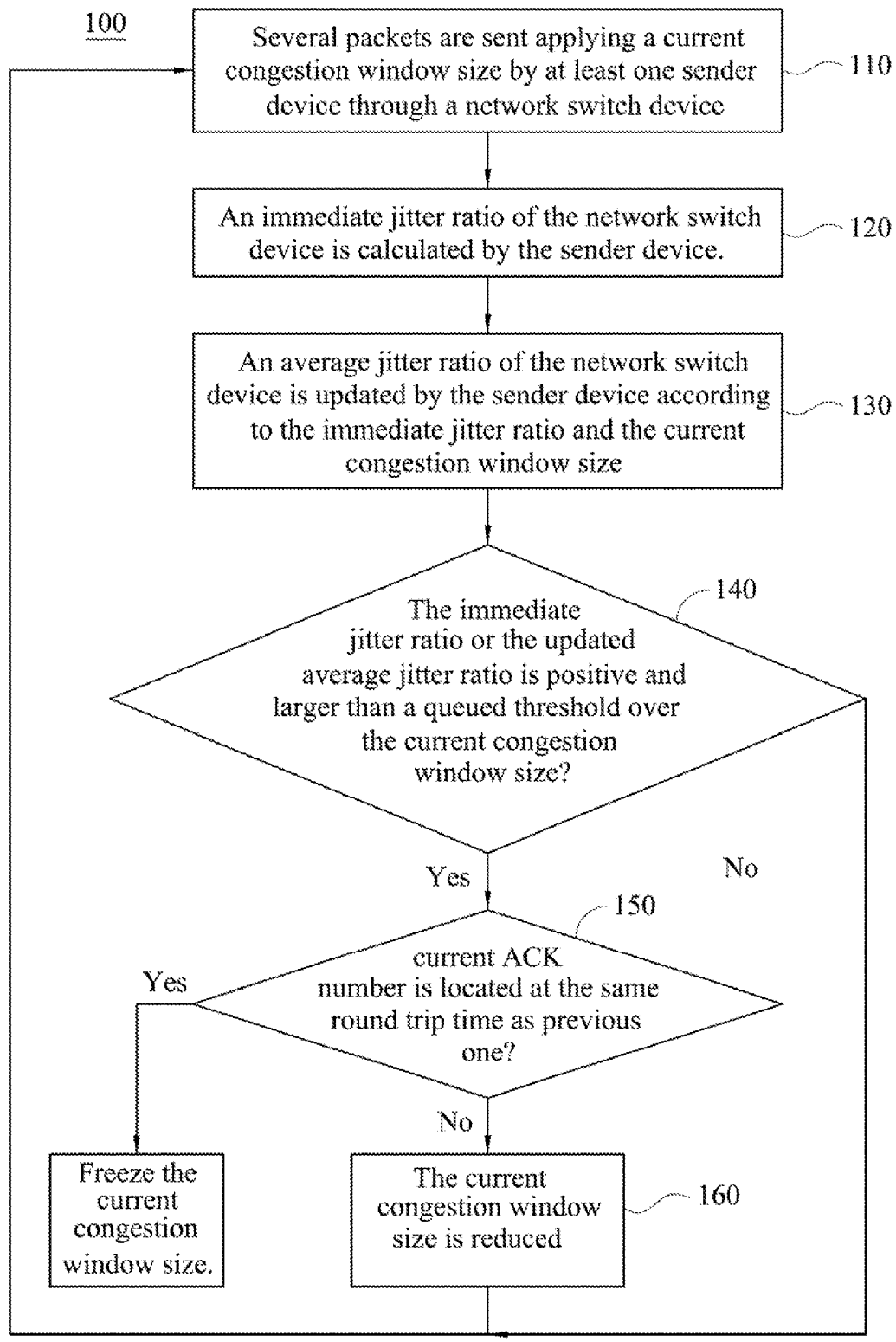
FIG. 3 is a flow diagram of a jitter-based transmission control method according to another embodiment of this invention.

FIG. 3 is a flow diagram of a jitter-based transmission control method according to another embodiment of this invention. It is to be understood that a description of aspects of this embodiment similar to those described with reference to FIG. 1 may not be repeated. Referring to both FIG. 2 and FIG. 3, before reducing the current congestion window size (step 160), the sender device 210 may check whether a current acknowledged (ACK) number is located at the same round trip time as that of a previous ACK packet.

When the current ACK number is not located at the same round trip time as that of the previous ACK packet, the current congestion window size is reduced (step 160).

At step 170, when the ACK number is located at the same round trip time as that of a previous ACK packet, the sender device 210 freezes the current congestion window size without reducing the same, such that the sender device 210 sends several packets applying the frozen current congestion window size. As multiple events happen in the same round trip time, they are taken as the same congestion notification. Under such circumstance, the current congestion window size is only frozen (not reduced) rather than reducing it unnecessarily to maintain the high utilization of links.

In some embodiments of this invention, the jitter-based transmission control method may 100 include the sender device 210 further capturing a current round trip time. The sender device 210 updates an average round-trip time according to the current round trip time. In some embodiments of this invention, the average round-trip time may be updated utilizing the following formula:

$$u\_t\_srtt = \alpha \times p\_t\_srtt + (1-\alpha) \times t\_rtt$$

where u_t_srtt is the updated average round-trip time, p_t_srtt is the average round-trip time before being updated, t_rtt is the current round trip time captured by the sender device 210, and α is a predefined parameter.

Subsequently, when the immediate jitter ratio is 0 and the current round trip time over the updated average round-trip time is more than a round-trip-time-ratio threshold, the current congestion window size is also reduced. The round-trip-time-ratio threshold may be 4. Therefore, if the current round trip time t_rtt exceeds four times the updated average round-trip time p_t_srtt, this indicates that the packet in the network switch device 220 experienced extra delay during transmission, which in turn implies that the current queue length in the network switch device 220 has increased and the current congestion window size should be reduced for avoiding congestion.

Figure 4:
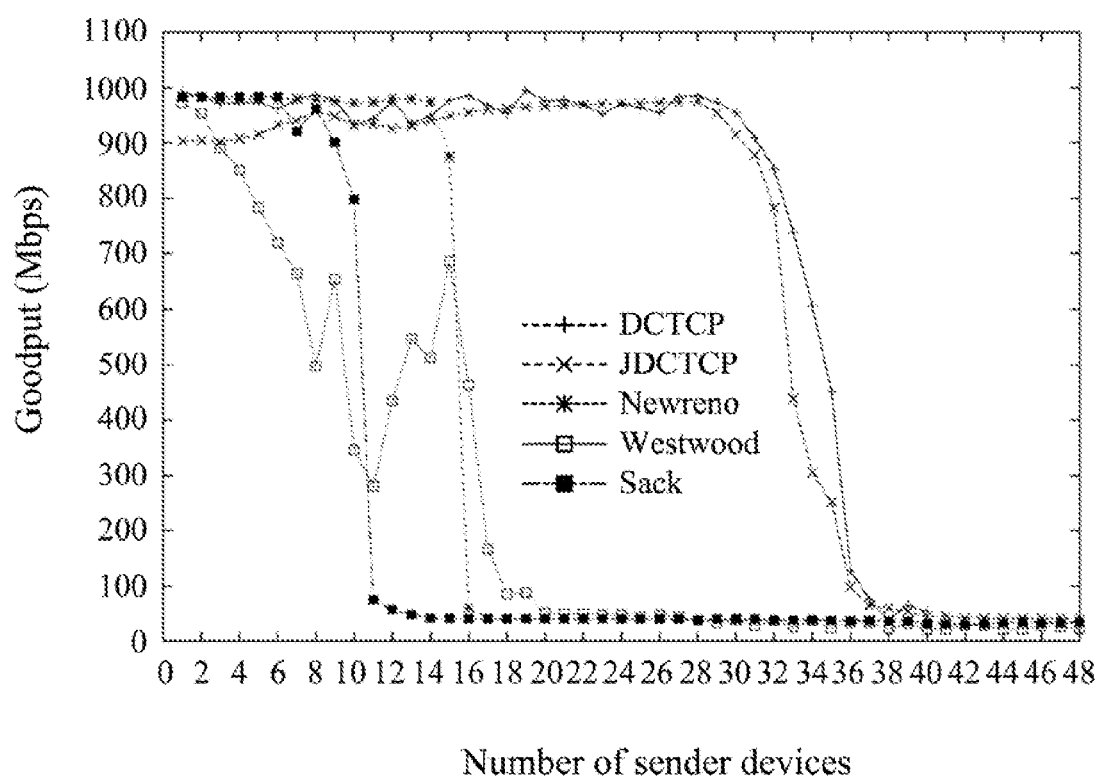
FIG. 4 and FIG. 5 show comparison results of goodput performance (FIG. 4) and query delay performance (FIG. 5) for one embodiment of the present invention, indicated as jitter-based TCP (JDCTCP) in the drawings, and other TCP variants.
Figure 5:
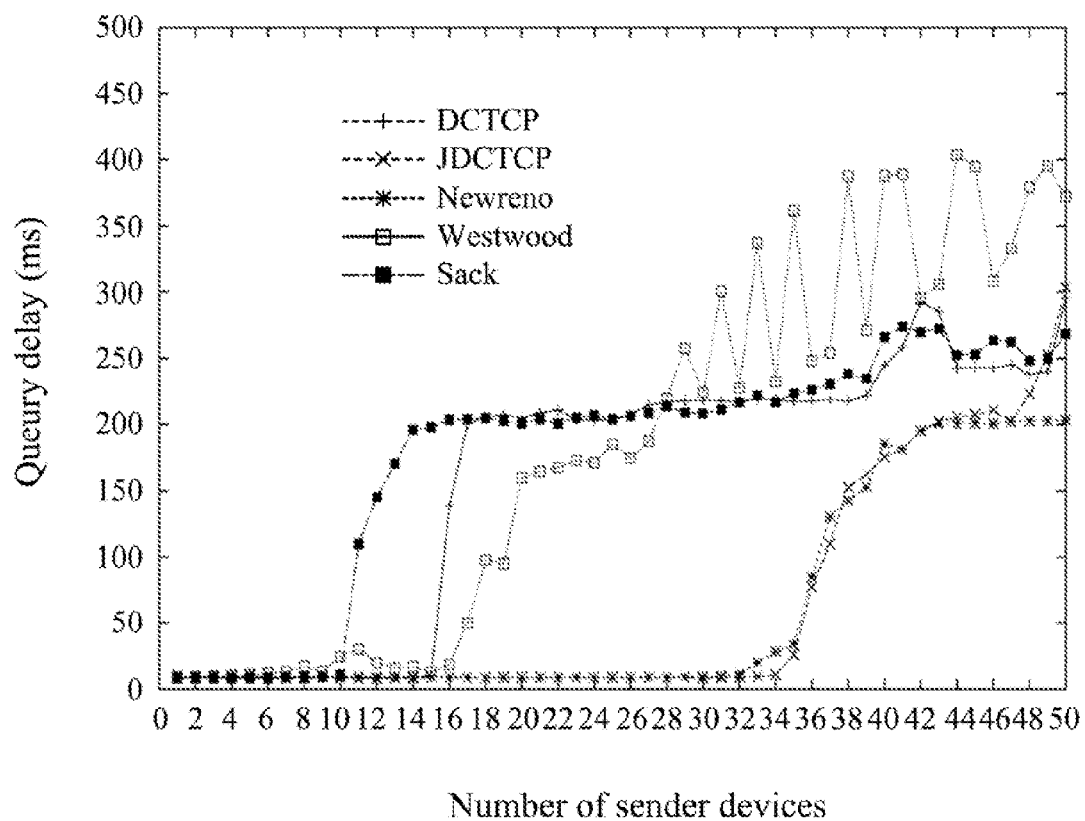
Figure 6:
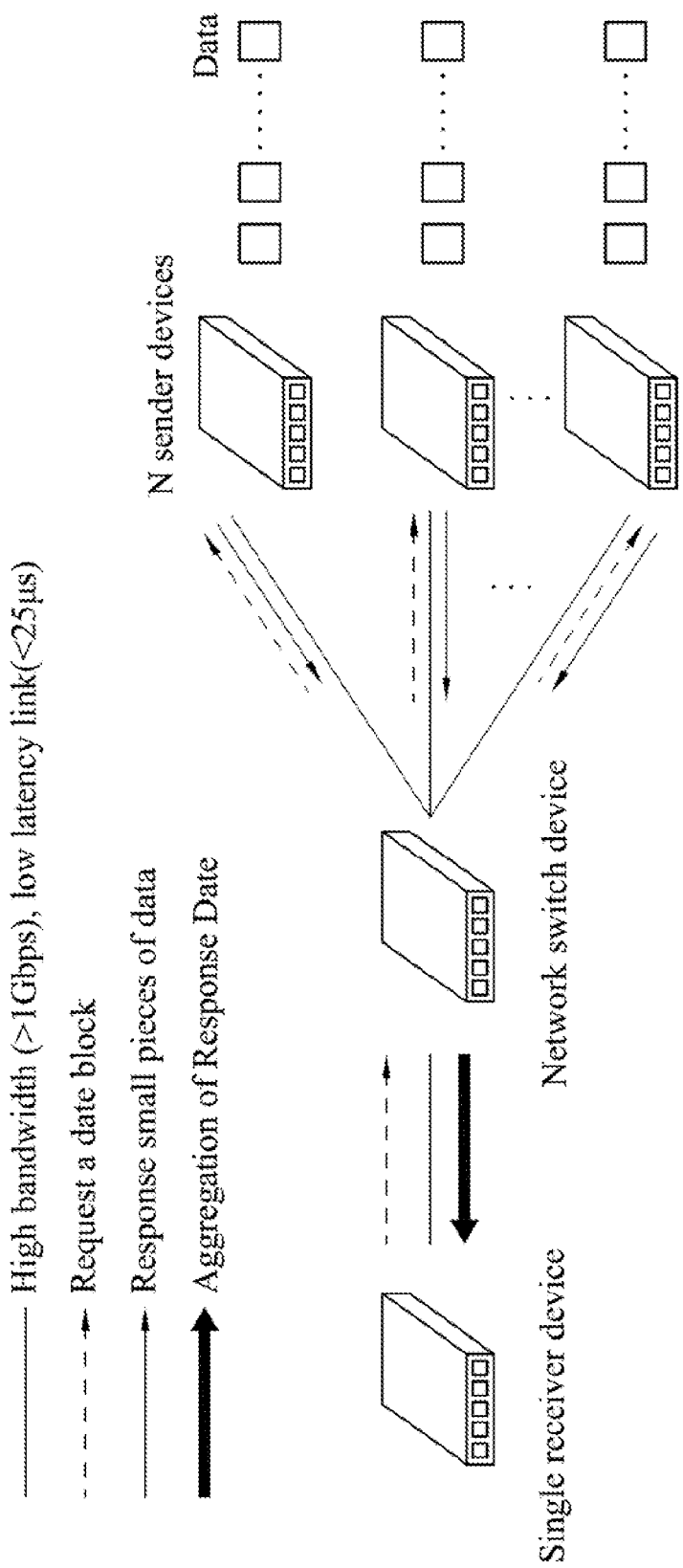
FIG. 6 illustrates a topology of the typical data center network.

FIG. 4 and FIG. 5 show comparison results of goodput performance (FIG. 4) and query delay performance (FIG. 5) for one embodiment of the present invention, indicated as jitter-based TCP (JDCTCP) in the drawings, and other TCP variants. The performance evaluation is implemented by using an ns2 simulator (S. McCanne, and S. Floyd. "ns Network Simulator," http://www.isi.edu/nsnam/ns/). The topology is the typical data center network depicted in FIG. 6. The module for TCP incest environment was developed by A. Phanishayee et al. (A. Phanishayee, E. Krevat, V. Vasudevan et al., "Measurement and analysis of TCP throughput collapse in cluster-based storage systems," in Proceedings of the 6th USENIX Conference on File and Storage Technologies, San Jose, Calif., 2008, pp. 1-14). All sender devices are connected through a single network switch device where the basic round-trip times are set to 100 μs. The bandwidth of each link is 1 Gbs, and the static switch buffer size of the network switch device is 100 KB. The packet size is 1500 KB. The $RTO_{min}$ in TCP is 200 ms. One node behaves as a client, and the others act as servers. The client will request a 1 MB data block from n servers. That is, each server has to respond with 1 MB/n bytes of data immediately. When the client receives 1 MB data, this is referred to as a round. The client will issue a next request until the previous round is finished. There are 1000 rounds in the simulation. The number of concurrent workers (sender devices) n is from 1 to 50. One embodiment of this invention is compared with other TCP variants including Newreno, Sack, Westwood, and DCTCP. The module of DCTCP was developed by Alizadeh et al. (M. Alizadeh, A. Javanmard, and B. Prabhakar, "Analysis of DCTCP: stability, convergence, and fairness," in Proceedings of the ACM SIGMETRICS joint international conference on Measurement and modeling of computer systems, San Jose, Calif., USA, 2011, pp. 73-84). Other TCP variants are built in an ns2 simulator. Detail parameters are shown in Table I.

TABLE I

Simulation parameters

| | |
|---|---|
| ns2 simulation version | ns 2.35 |
| Number of concurrent sender devices | 1-50 |
| Link bandwidth | 1 Gbps |
| Round Trip Time (RTT) | 100 μs |
| Per-post switch output buffer of network switch device | 100 packets |
| TCP packet size | 1500 KB |
| DATA block size | 1 MB |
| Number of rounds in the incast | 1000 |
| $RTO_{min}$ in TCP | 200 ms |

The goodput of a flow is defined as:

$$Goodput = \frac{Number\_of\_rounds \times Block\_size}{Simulation\_Time}$$

where Number_of_rounds is 1000 and Block_size is 1 MB in the simulation.

Average query delay is defined as $$Average\_query\_delay = \frac{Simulation\_Time}{Number\_of\_rounds}$$

As shown in FIG. 4, the goodputs of JDCTCP tone embodiment of the present invention) and DCTCP are more than those of other TCP variants, indicating that JDCTCP (one embodiment of the present invention) and DCTCP outperform other TCP variants substantially in goodput. The performances of NewReno, Westwood and Sack drop dramatically when the concurrent sender devices exceed 16, 11 and 10 respectively. JDCTCP (one embodiment of the present invention) and DCTCP perform well until the number of concurrent sender devices is larger than 35 where each sending 2 packets could exceed the static buffer size at the network switch device (35×2×1.5 KB>100 KB). Because of the unstable property of short-term flow, JDCTCP (one embodiment of the present invention) loses little performance when the number of concurrent sender devices is small.

As shown in FIG. 5, the average query delays of JDCTCP (one embodiment of the present invention) and DCTCP are less than that of other TCP variants, indicating that JDCTCP (one embodiment of the present invention) and DCTCP outperform other TCP variants substantially in average query delay.

Since DCTCP relies on the assistance of an ECN mechanism in the network switch device, it can provide a more precise estimation of queue distribution. However, JDCTCP (one embodiment of the present invention) can achieve as great a performance as the DCTCP either goodput or delay. Furthermore, JDCTCP (one embodiment of the present invention) is an end-to-end solution without any intermediate node support. In other words, JDCTCP (one embodiment of the present invention) requires a lower cost than DCTCP to reach the same performance in both goodput and average query delay.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A jitter-based transmission control method comprising:
 (a) sending a plurality of packets applying a current congestion window size by at least one sender device through a network switch device;
 (b) calculating an immediate jitter ratio of the network switch device by the at least one sender device;
 (c) updating an average jitter ratio of the network switch device by the at least one sender device according to the immediate jitter ratio and the current congestion window size; and
 (d) reducing the current congestion window size when the immediate jitter ratio or the updated average jitter ratio is positive and larger than a queued threshold over the current congestion window size, such that the plurality of packets are sent applying the reduced current congestion window size, wherein the current congestion window size is reduced utilizing:

$$r\_cwnd = \text{Max}\left(c\_cwnd \times (1 - u\_Avg\_Jr), \frac{c\_cwnd}{2}\right)$$

where r_cwnd is the reduced current congestion window size, c_cwnd is the current congestion window size before being reduced, and u_Avg_Jr is the updated average jitter ratio.

2. The jitter-based transmission control method of claim 1 further comprising:
capturing a current round trip time by the at least one sender device;
updating an average round-trip time according to the current round trip time; and
reducing the current congestion window size when the immediate jitter ratio is U and the current round trip time over the average round-trip time is more than a round-trip-time-ratio threshold.

3. The jitter-based transmission control method of claim 2, wherein the round-trip-time-ratio threshold is 4.

4. The jitter-based transmission control method of claim 1, wherein the average jitter ratio is updated utilizing:

$$u\_Avg\_Jr = p\_Avg\_Jr \times g + i\_Jr, \; g = \frac{1}{w}$$

where u_Avg_Jr the updated average jitter ratio, p_Avg_Jr is the average jitter ratio before being updated, w is the current congestion window size, and i_Jr is the immediate jitter ratio.

5. The jitter-based transmission control method of claim 1, wherein the queued threshold is 1.

6. The jitter-based transmission control method of claim 1 further comprising:
checking whether a current acknowledged (ACK) number is located at a same round trip time as a round trip time of a previous ACK packet before reducing the current congestion window size; and
freezing the current congestion window size without reducing the congestion window size when the ACK number is located at the same round trip time as the round trip time of a previous ACK packet.

7. The jitter-based transmission control method of claim 1 further comprising:
reducing the current congestion window size when the ACK number is not located at a same round trip time as a round trip time of a previous ACK packet.

8. The jitter-based transmission control method of claim 1, wherein a number of the at least one sender device is more than one, and each sender device executes steps (a), (b), (c), (d) independently.

9. The jitter-based transmission control method of claim 1, wherein the at least one sender device and the network switch device are disposed in a same data center network.

10. The jitter-based transmission control method of claim 1, further comprising:
performing an additive increase multiplicative decrease (AIMD) scheme when a successful transmission occurs during sending of the packets.

11. The jitter-based transmission control method of claim 10, further comprising:
keeping the current congestion window size the same when the immediate jitter ratio is negative.

* * * * *